US012728946B1

(12) United States Patent
Vodev

(10) Patent No.: US 12,728,946 B1
(45) Date of Patent: Sep. 8, 2026

(54) FOLDABLE BICYCLE

(71) Applicant: Valentin Jordanov Vodev, Vienna (AT)

(72) Inventor: Valentin Jordanov Vodev, Vienna (AT)

( * ) Notice: Subject to any disclaimer, the term of this patent is extended or adjusted under 35 U.S.C. 154(b) by 428 days.

(21) Appl. No.: 18/353,086

(22) Filed: Jul. 16, 2023

(51) Int. Cl.
*B62K 15/00* (2006.01)
*B62K 19/34* (2006.01)

(52) U.S. Cl.
CPC ............ *B62K 15/008* (2013.01); *B62K 19/34* (2013.01)

(58) Field of Classification Search
CPC .... B62K 15/00; B62K 15/006; B62K 15/008; B62K 2015/001
See application file for complete search history.

(56) References Cited

U.S. PATENT DOCUMENTS 6,279,935 B1 * 8/2001 Wagner ................ B62K 15/006 280/287
2005/0218624 A1 * 10/2005 Sherman .............. B62K 15/006 280/278
2008/0116659 A1 * 5/2008 Seaman ............... B62K 15/006 280/278
2009/0096187 A1 * 4/2009 Lapierre .................. A45C 5/04 280/287

FOREIGN PATENT DOCUMENTS

GB 2296224 A * 6/1996 ........... B62K 15/006

OTHER PUBLICATIONS

GB 2296224A, Malcom Graham Perry (Year: 1996).*

* cited by examiner

*Primary Examiner* — Jacob S. Scott
(74) *Attorney, Agent, or Firm* — Michael D. Eisenberg

(57) ABSTRACT

A foldable bicycle comprising two seat stays, two chain stays, a bottom bracket, a non-rotating washer, and a rotating washer. Each seat stay has a respective second front end and a respective second rear end. Each chain stay has a respective third front end and a respective third rear end, each of the third rear ends being joined to the second rear end of a respective seat stay. The non-rotating washer is centered about a rotation axis, is joined to the bottom bracket tube, and disposed at an angle with the pedal axle and the pedal axis, such that the rotation axis is at an angle with respect to the pedal axis. The rotating washer is joined to and rotatable with respect to the non-rotating washer around the rotation axis, the rotating washer being joined to third front ends of the chain stays, such that chain stays are configured to be rotated about the rotation axis.

14 Claims, 14 Drawing Sheets

100

100

100

100

100

100

FOLDABLE BICYCLE

TECHNICAL FIELD

This invention relates to bicycles.

BACKGROUND OF THE INVENTION

Bicycles are a common means of transportation around the world. Bicycle riders sometimes use their bicycles for a portion of a trip, and resort to other means of transportation, such as buses or trains, for example, to continue the trip. Space in a bus or train for the bicycle may be scarce. Moreover, bicycles can be large and uncomfortable to store at the destination.

Some bicycles are foldable, to enable the riders to easily carry and store the bicycles. For example, U.S. Pat. No. 10,710,669, which was invented by the inventor of the present patent application relates to a foldable fork of a bicycle, comprising a stem having a first end and a second end; a pair of prongs configured to receive an axle of a bicycle wheel; and a pivot having an axis that is angled with respect to the axle of a bicycle wheel when connected to the prongs, the pivot connected to the second end of the stem on a top section of the pivot and connected to the pair of prongs on a bottom section of the pivot. The top section of the pivot is configured to receive the bottom section of the pivot. When the bottom section of the pivot is rotated away from the top section, a wheel connected to the prongs is offset by a distance to a side of a frame connected to the bicycle.

U.S. Pat. No. 10,710,669 teaches a technique for folding the front portion section of a bicycle. However, folding the rear portion of the bicycle, by folding the rear wheel toward the front is complex, since the chain of the bicycle is in the way. In previous technology, a swivel axle is behind the pedal axle, and a belt tensioner is required for the chain because the chain needs to be extended or compressed. This requires additional components (tensioner) which makes the bicycle heavier, and more detrimentally, the bicycle drive is less efficient.

BRIEF SUMMARY OF EMBODIMENTS OF THE INVENTION

An aim of the present invention is to provide a foldable bicycle that folds without the need for a chain tensioner.

Therefore, an aspect of some embodiments of the present invention relates to a foldable bicycle comprising a head tube, a seat tube, a down tube, two seat stays, a forward shaft, two chain stays, a pedal axle, a bottom bracket, at least one non-rotating washer, and at least one rotating washer. The seat tube has a top end and bottom end. The down tube has a first front end and a first rear end, the first front end being joined to the head tube. Each of the two seat stays has a respective second front end and a respective second rear end. The forward shaft is joined to both of the second front ends and is removably joinable to the seat tube, to selectively join the seat stays to and remove the seat stays from the seat tube. Each of the two chain stays has a respective third front end and a respective third rear end, each of the third rear ends being joined to the second rear end of a respective one of the seat stays. The pedal axle extends along a pedal axis. The bottom bracket tube is traversed by the pedal axle, and is joined to at least one of the first rear end of the down tube and the bottom end of the seat tube. The at least one non-rotating washer is centered about a rotation axis, is joined to the bottom bracket tube, and disposed at an angle with the pedal axle and the pedal axis, such that the rotation axis is at an angle with respect to the pedal axis. The at least one rotating washer is joined to and rotatable with respect to the at least one non-rotating washer around the rotation axis, the at least one rotating washer being joined to third front ends of the chain stays, such that chains stays are configured to be rotated about the rotation axis for folding and unfolding the bicycle.

In a variant, the pedal axis and the rotation axis meet on a plane that divides the bicycle into two lateral halves.

In another variant, the bottom bracket tube is joined to the first rear end of the down tube and to the bottom end of the seat tube.

In yet another variant, the bottom bracket tube is joined to the bottom end of the seat tube, while the first rear end of the down tube is joined to the seat tube.

In some embodiments of the present invention: the bottom bracket tube is hollow; the at least one non-rotating washer is disposed inside the bottom bracket tube; the at least one rotating washer is disposed on an inner circumference the at least one non-rotating washer; the pedal axle traverses the at least one rotating washer and is configured to rotate around the pedal axis, independently of the at least one rotating washer.

In a variant, the bracket tube is tilted with respect to the pedal axle and the pedal axis.

In another variant, the at least one non-rotating washer comprises at least two non-rotating washers parallel to each other, each being centered around the rotation axis.

In yet another variant, the bottom bracket tube is a hollow cylinder.

In some embodiments of the present invention: the bottom bracket is hollow and is traversed by the pedal axle; the at least one non-rotating washer comprises two non-rotating washers joined to an outer surface of the bottom bracket, one on each side of the seat tube; the at least one rotating washer comprises two rotating washers, each rotating washer being disposed on an outer circumference of a respective one of the two non-rotating washers, such that each of the rotating washers is configured to rotate independently of the respective one of the non-rotating washers; the fourth front end of each of the chain stays is joined to a respective one of the rotating washers.

The bottom bracket tube may be a hollow cylinder.

In a variant, the foldable bicycle includes two structural rods, each joined to a respective one of the seat stays and a respective one of the chain stays.

In another variant, the seat tube comprises a rear jutting, extending rearward and being configured to be selectively joined to the forward shaft.

In yet another variant, the foldable bicycle further comprising a foldable fork, which comprises: a stem traversing the head tube; a pair of prongs configured to receive an axle of a front bicycle wheel; a pivot, having an axis that is angled with respect to the axle of the bicycle wheel when the axle is connected to the prongs, the pivot connected to the stem below the head tube on a top section of the pivot and connected to the pair of prongs on a bottom section of the pivot. The top section of the pivot is configured to receive the bottom section of the pivot. The stem is configured to disengage from the pair of prongs when the bottom section of the pivot is rotated away from the top section of the pivot and wherein when connected, the bicycle wheel is disposed to a side of a connected frame of the bicycle. When the front bicycle wheel is connected, the axis of the pivot is oriented at an acute angle with respect to an axle of the connected wheel when both the axis and the axle are projected onto a plane perpendicular to a line of sight from a rear of the connected bicycle frame. The axis of the pivot is oriented at an acute angle with respect to the axle of a connected front wheel when both the axis and the axle are projected onto a plane perpendicular to a line of sight from above the foldable fork.

In a further variant, the foldable bicycle further includes a top tube having a fourth front end and fourth rear end, wherein the fourth front end is joined to the head tube and the fourth rear end is joined to the seat tube.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Figure 1:
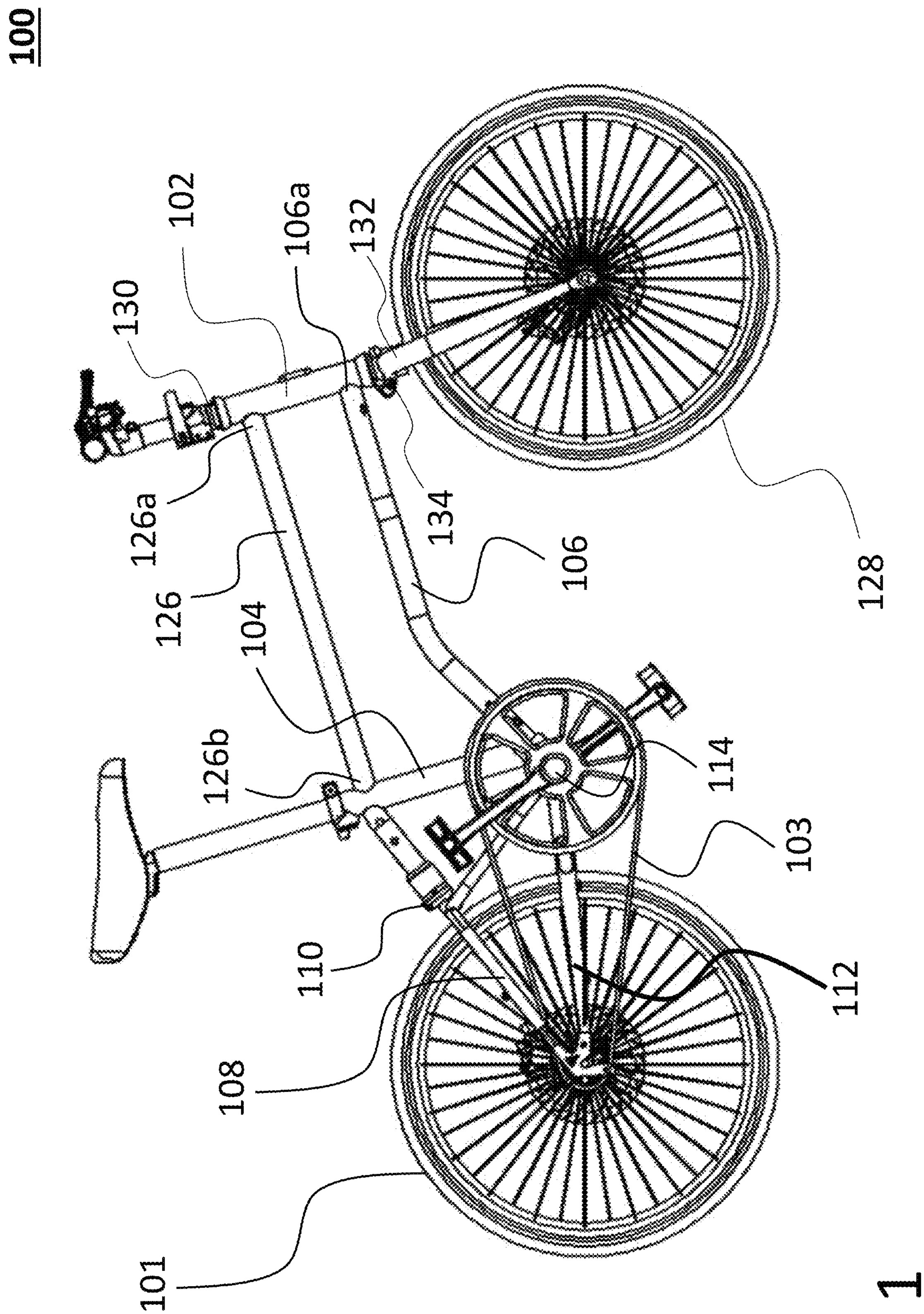
FIG. 1 is a side view of a foldable having a bottom bracket tube, two non-rotating washers mounted on an outer surface of the bottom bracket tube at an angle with the pedal axle, and two rotating washers, each disposed on an outer circumference of a respective one of the two non-rotating washers, according to some embodiments of the present invention.
Figure 2:
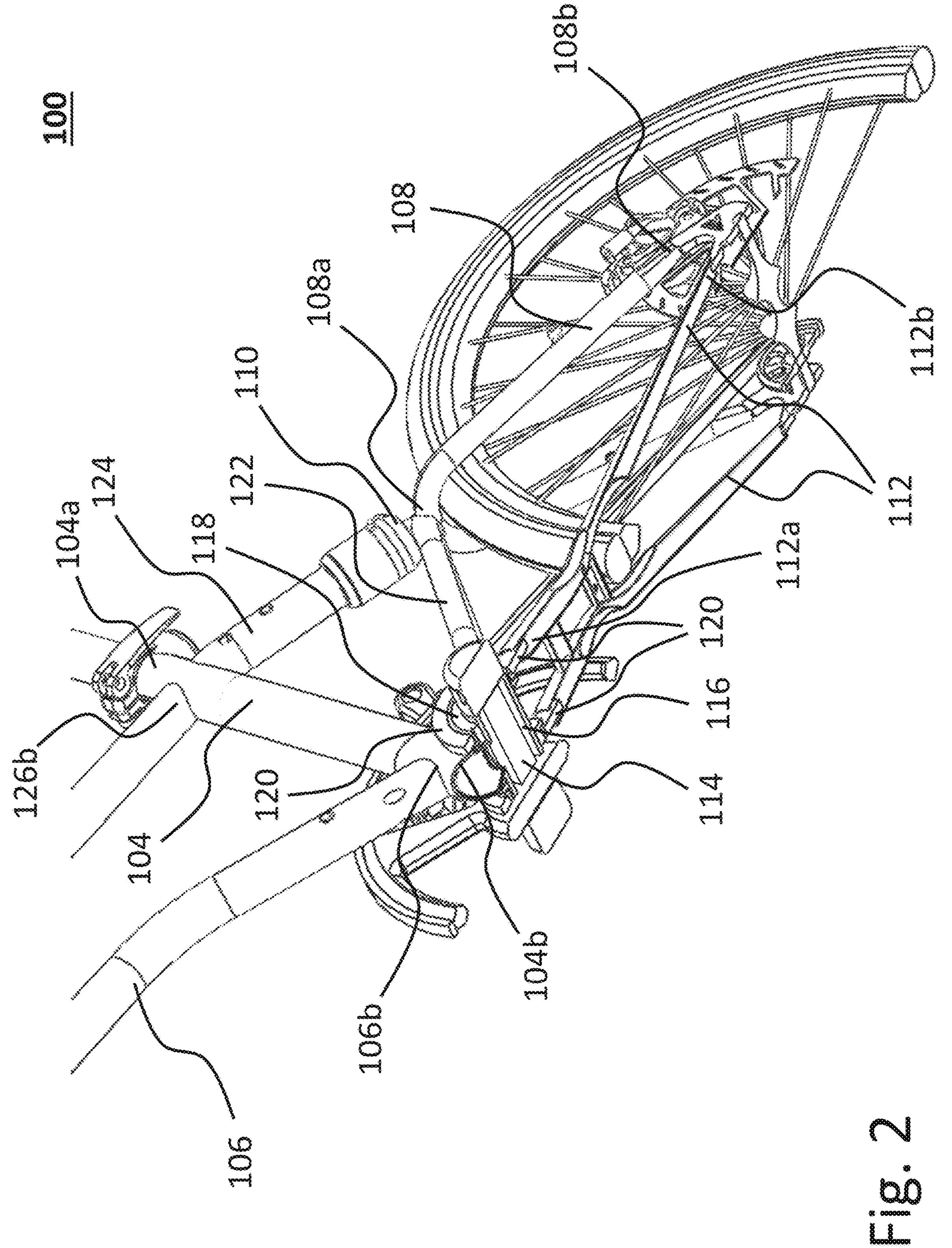
FIG. 2 is a perspective view of the bicycle of FIG. 1, focused on the bottom bracket tube, non-rotating washers, and rotating washer.
Figure 3:
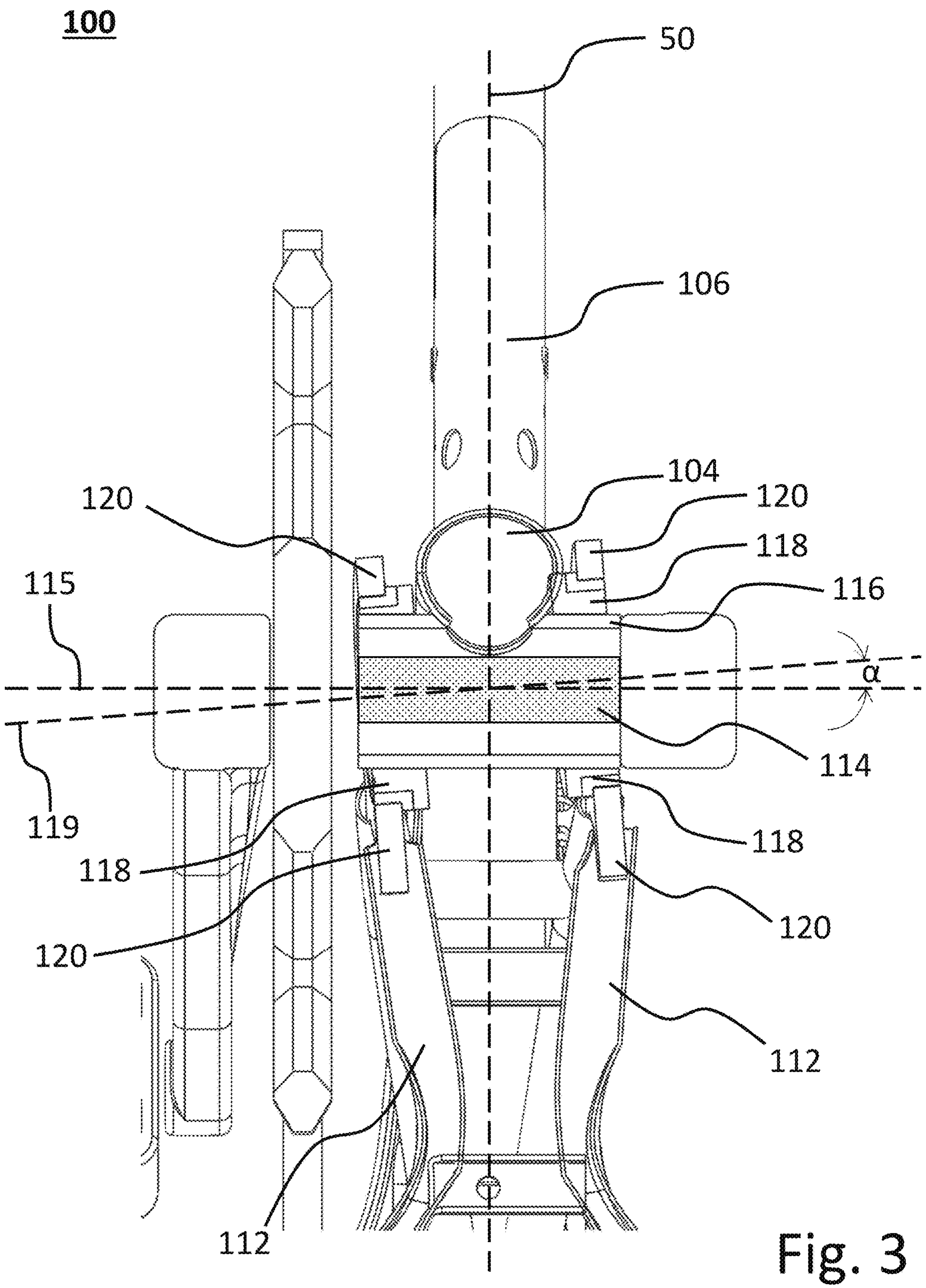
FIG. 3 is a bottom, cross sectional view of the region of the bicycle of FIG. 1, which includes the bottom bracket tube, non-rotating washers, and rotating washer.

Referring now to the figures, FIG. 1 is a side view of a foldable having a bottom bracket tube, two non-rotating washers mounted on an outer surface of the bottom bracket tube at an angle with the pedal axle, and two rotating washers, each disposed on an outer circumference of a respective one of the two non-rotating washers, according to some embodiments of the present invention. FIG. 2 is a perspective view of the bicycle of FIG. 1, focused on the bottom bracket tube, non-rotating washers, and rotating washer. FIG. 3 is a bottom, cross sectional view of the region of the bicycle of FIG. 1, which includes the bottom bracket tube, non-rotating washers, and rotating washer.

The foldable bicycle 100 includes a head tube 102, a seat tube 104, a down tube 106, two seat stays 108, a forward shaft 110, two chain stays 112, a pedal axle 114, a bottom bracket tube 116, at least one non-rotating washer 118, and at least one rotating washer 120. In the example of FIGS. 1-3, two non-rotating washers 118 and two rotating washers 120 are present, as will be explained further below.

The seat tube 104 is a shaft having a top end **104*a* and bottom end 104*b*. The down tube 106 is a shaft having a first front end 106*a* and a first rear end 106*b*. The first front end 106*a* is joined to the head tube 102**.

The seat stays 108 are disposed on opposing sides of the rear wheel 101. Each of the seat stays 108 has a respective second front end **108*a* and a respective second rear end 108*b*. The forward shaft 110 is joined to both of the second front ends 108*a* of the seat stays 108 and is removably joinable to the seat tube 104, to selectively join the seat stays 108 to and remove the seat stays 108 from the seat tube 104**.

The chain stays 112 are disposed on opposing sides of the rear wheel 101. Each of the chain stays 112 a respective third front end 112*a* and a respective third rear end 112*b*. Each of the third rear ends 112*b* is joined to the second rear end 108*b* of a respective one of the seat stays 108. In this manner, each chain stay 112 is joined to and at an angle with a respective seat stay 108 on the same side of the rear wheel 101. Both seat stays and both chain stays extend ahead to clear the rear wheel 101. In some embodiments of the present invention, the meeting points of the seat stays 108 meet their respective chain stays 112 are aligned with each other and the axle of the of the rear wheel along the rotation axis of the rear wheel 101.

The pedal axle 114 extends along a pedal axis 115 perpendicular to a plane 50 that divides the bicycle into two lateral halves. The pedal axle is joined to pedal on both ends thereof.

The bottom bracket tube 116 is traversed by the pedal axle 114. The bottom bracket tube 116 is joined to the first rear end 106*b* of the down tube 106 and/or to the bottom end 104*b* of the seat tube 104. In the non-limiting example of FIGS. 1-3, the bottom end 104*b* of the seat tube 104 is joined to the bottom bracket tube 116, while the first rear end 106*b* of down tube 106 is joined to the seat tube 104 near the bottom end 104*b*. As will be shown further below, in FIGS. 11-13, the bottom bracket tube 116 may be joined to both the seat tube 104 and to down tube 106. In some embodiments of the present invention (not drawn), the bottom bracket tube 116 is joined only to the down tube 106, while the seat tube 104 is joined to the down tube, but not to the bottom bracket tube 116.

One or more non-rotating washers 118 are centered about a rotation axis 119, joined to the bottom bracket tube 116, and disposed at an angle with the pedal axle 114 and the pedal axis 115, when viewed from below the bicycle or above the bicycle. In this manner, the rotation axis 119 is at an angle $\alpha$ with respect to the pedal axis 115. In some embodiments of the present invention, the pedal axis 115 and the rotation axis 119 meet on the plane 50. In a non-limiting example, the angle $\alpha$ is between 6 and 10 degrees, for example, 8.34 degrees. It is understood that the angle $\alpha$ may have different values outside of the above-mentioned range, and that the scope of the present invention is not limited by such range.

Figure 10:
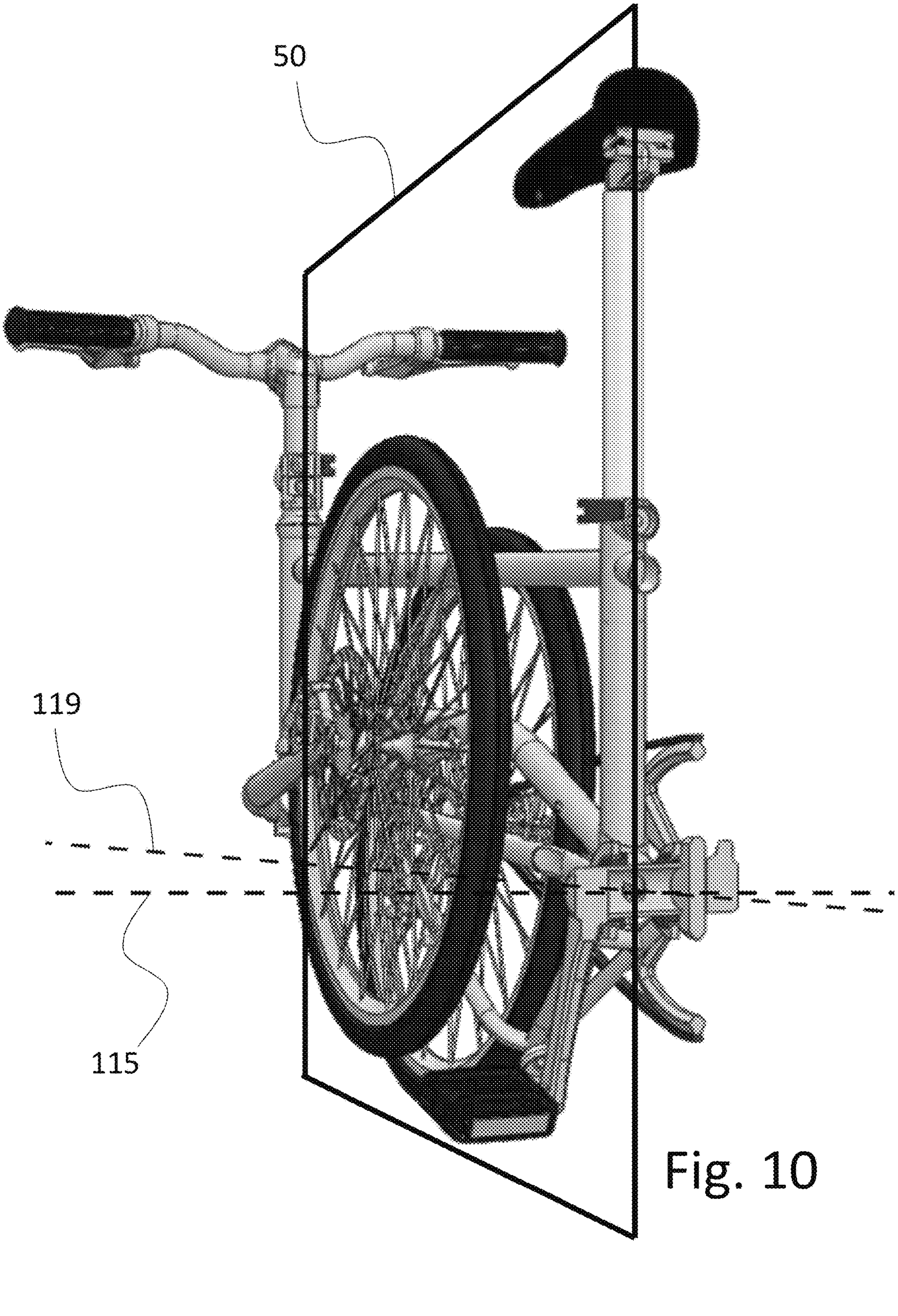
FIG. 10 is a perspective view of a folded bicycle in which the rear wheel was folded as shown in FIGS. 4-6 and the front wheel was folded as shown in FIGS. 7-9, according to some embodiments of the present invention.

One or more rotating washers 120 are joined to and are rotatable with respect to the one non-rotating washer 118 around the rotation axis 119. The one or more rotating washers 120 are joined to third front ends 112*a* of the chain stays 112. In this manner, the chains stays 112 are configured to be rotated about the rotation axis 119 for folding and unfolding the bicycle 100. Once the forward shaft 110 is separated from the seat tube 104, the rear portion of the bicycle (which includes the rear wheel 101, the chain 103, the chain stays 112, and the seat stays 108) can be rotated about the rotation axis 119 at an angle with the plane 50 and with the pedal axis, such that the rear wheel and the chain are located on one side of the plane 50 when folded, as seen in FIG. 10.

In the example of FIGS. 1-3, two non-rotating washers 118 are present, each non-rotating washer 118 being disposed on different sides of the plane 50. Similarly, two rotating washers 120 are present, each being joined to a respective non-rotating washer 118. The non-rotating washers 118 are joined to the outer surface of the bottom bracket tube 116, and the rotating washers 120 are joined to the outer surface of the respective non-rotating washers 118.

In the example of FIGS. 1-3, the outer surfaces of the non-rotating washers 118 and the inner surfaces of the rotating washers 120 are circular, to enable rotation of the rotating washers 120 relative to the non-rotating washers 118.

In a non-limiting example, the bottom bracket tube 116 is in the form of a hollow cylinder. However, it should be noted that the bottom bracket tube 116 may have any three-dimensional shape.

In some embodiments of the present invention, the bicycle includes two structural rods 122. Each structural rod 122 is joined to a respective seat stay 108 and to a respective chain stay 112 on the same side of the plane 50. The structural rods 122 provide structural strength to the bicycle 100.

In some embodiments of the present invention, the seat tube 104 includes comprises a rear jutting 124, extending rearward and being configured to be selectively joined to the forward shaft 110.

In some embodiments of the present invention, the bicycle 110 also includes a top tube 126 having a fourth front end 126*a* and fourth rear end 126*b*. The fourth front end 126*a* is joined to the head tube 102 and the fourth rear end is joined to the seat tube 104. The top tube 126 is located above the down tube 106, and provides structural strength to the bicycle.

In some embodiments of the present invention, the bicycle 100 further includes a mechanism for folding the front wheel as well. In a non-limiting example, the mechanism includes a foldable fork, as described in U.S. Pat. No. 10,710,669 which shares the inventor of the present invention, and is incorporated herein by reference.

The foldable fork includes a stem 130 traversing the head tube 102, a pair of prongs 132 configured to receive an axle of a front bicycle wheel 128, and a pivot 134 having an axis that is angled with respect to the axle of the front bicycle wheel when the axle is connected to the prongs. The pivot 134 is connected to the stem 130 below the head tube 102 on a top section of the pivot and connected to the pair of prongs 132 on a bottom section of the pivot.

The top section of the pivot 134 is configured to receive the bottom section of the pivot. The stem 130 is configured to disengage from the pair of prongs 132 when the bottom section of the pivot 134 is rotated away from the top section of the pivot 134. When the bottom section of the pivot 134 is rotated away from the top section of the pivot 134, the front bicycle wheel 128 is disposed to a side of a connected frame (or a side of the plane 50) of the bicycle.

When the bottom section of the pivot 134 is connected to the top section of the pivot 134, the axis of the pivot is oriented at an acute angle with respect to an axle of the front bicycle wheel 128, when both the axis and the axle of the front bicycle wheel 128are projected onto a plane perpendicular to a line of sight from a rear of the connected bicycle frame.

The axis of the pivot is oriented at an acute angle with respect to the axle of the connected front wheel when both the axis and the axle are projected onto a plane perpendicular to a line of sight from above the foldable fork.

Figure 4:
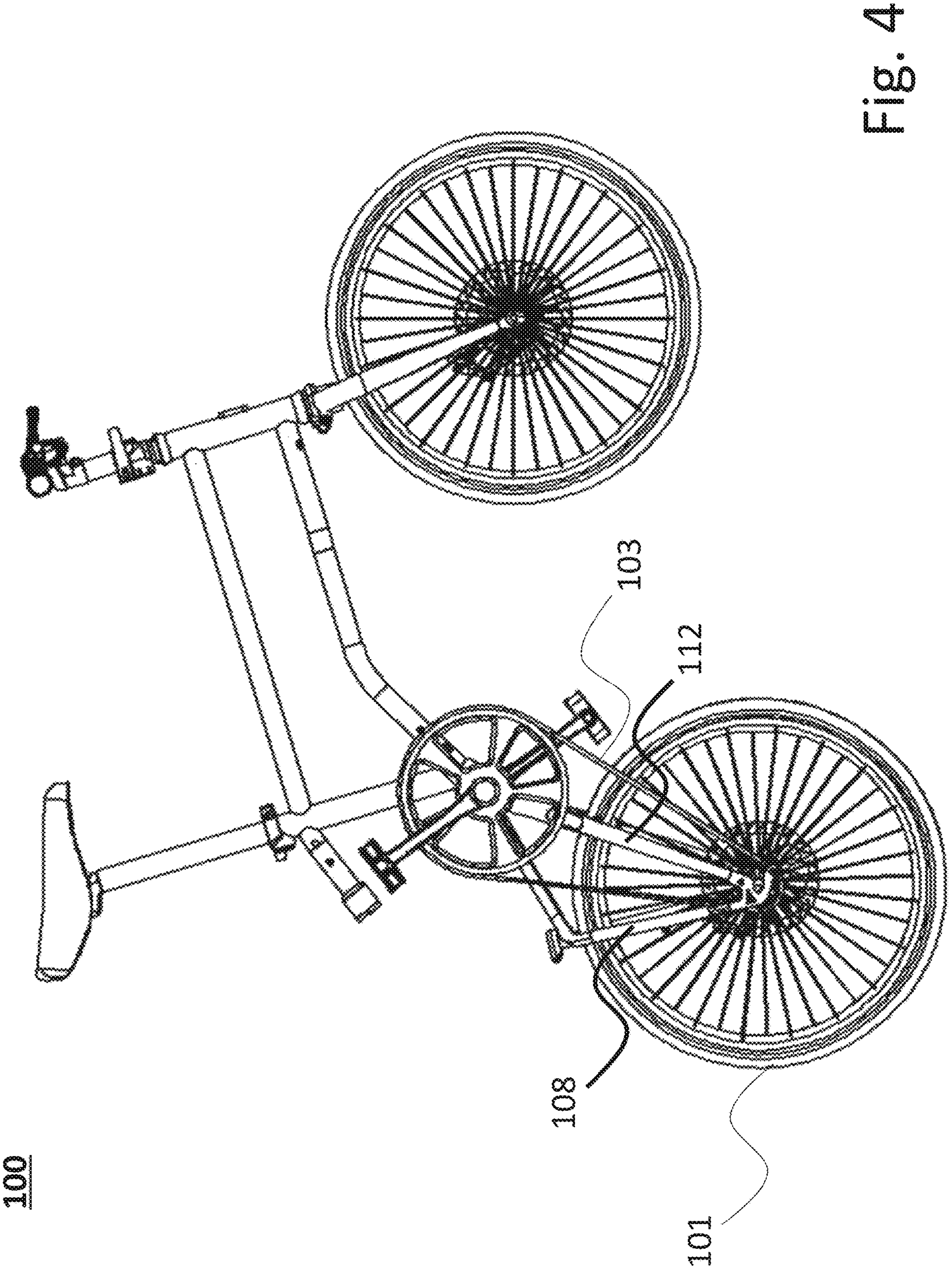
FIGS. 4-6 illustrates stages of a folding of the rear wheel of the bicycle of FIG. 1, according to some embodiments of the present invention.
Figure 5:
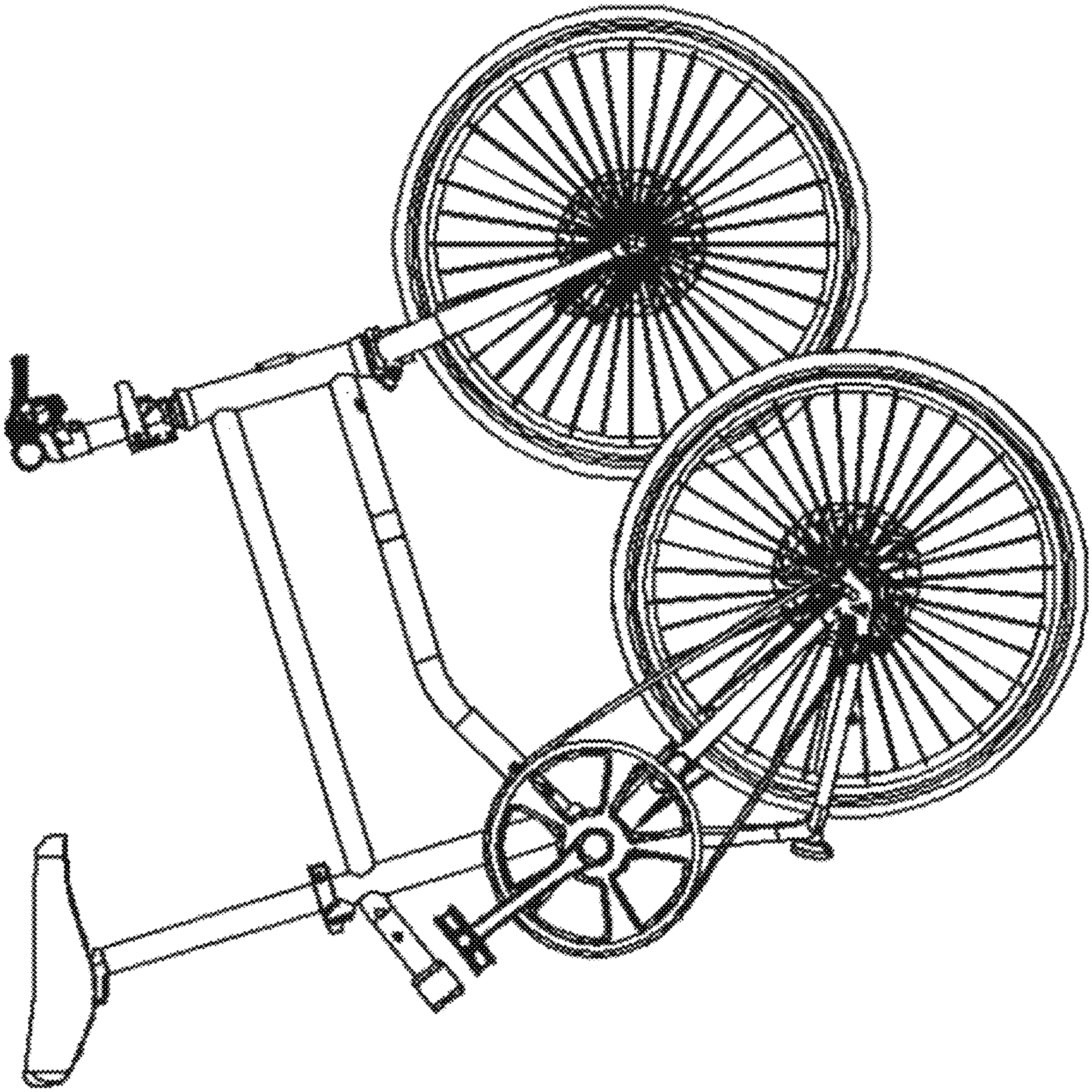
Figure 6:
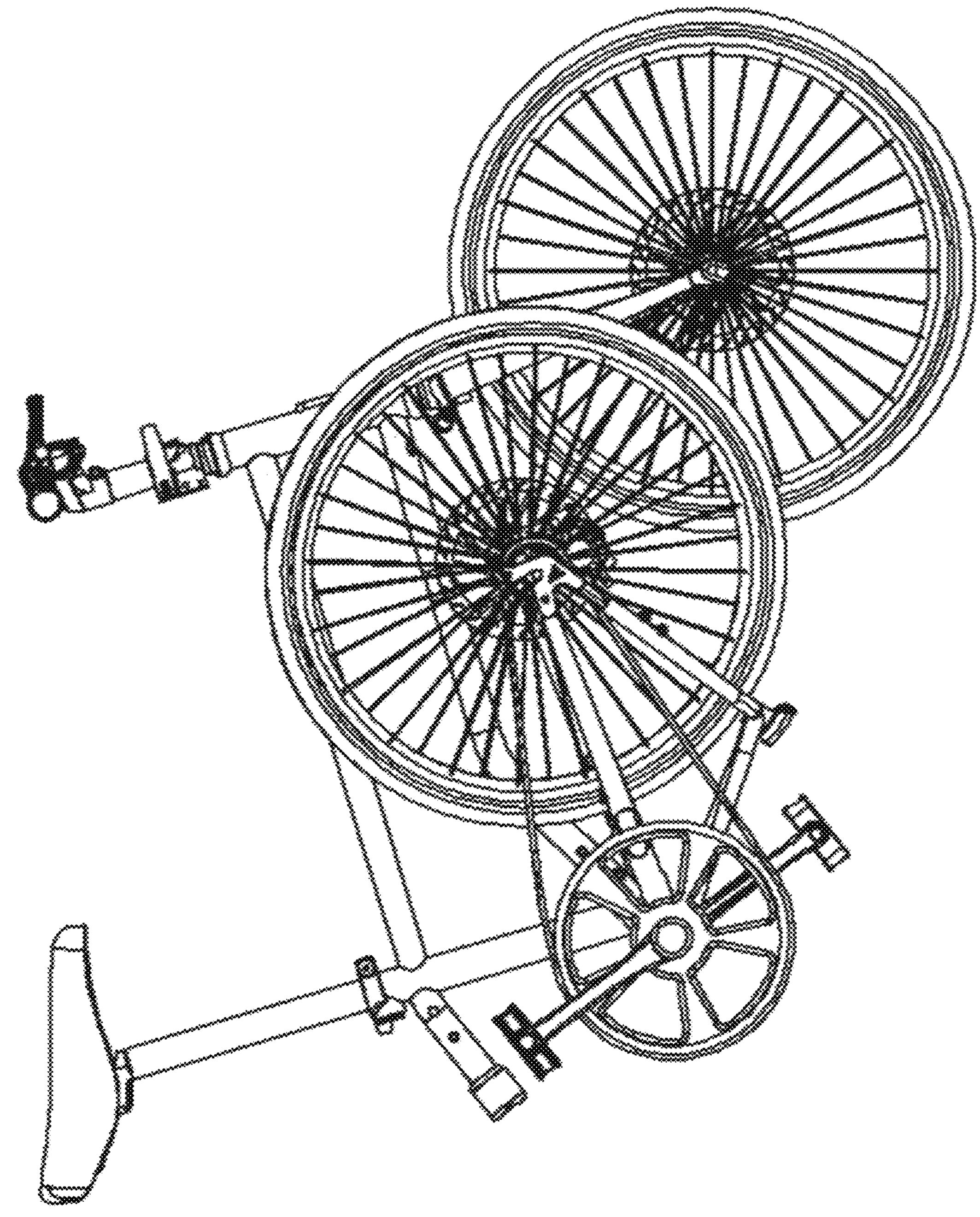

FIGS. 4-6 illustrates stages of a folding of the rear wheel of the bicycle of FIGS. 1-3, according to some embodiments of the present invention.

In FIG. 4, the forward shaft 110 is disconnected from the seat tube 104. In FIGS. 5 and 6, the rear portion of the bicycle (which includes the rear wheel 101, the chain 103, the chain stays 112, and the seat stays 108) is rotated about the rotation axis 119 (of FIG. 3) at an angle with the plane 50 (of FIG. 3) and with the pedal axis. When the rear portion of the bicycle is fully rotated into its folded position (FIG. 6), that the rear wheel 101 and the chain 103 are located on one side of the plane 50, as seen in FIG. 10.

Figure 7:
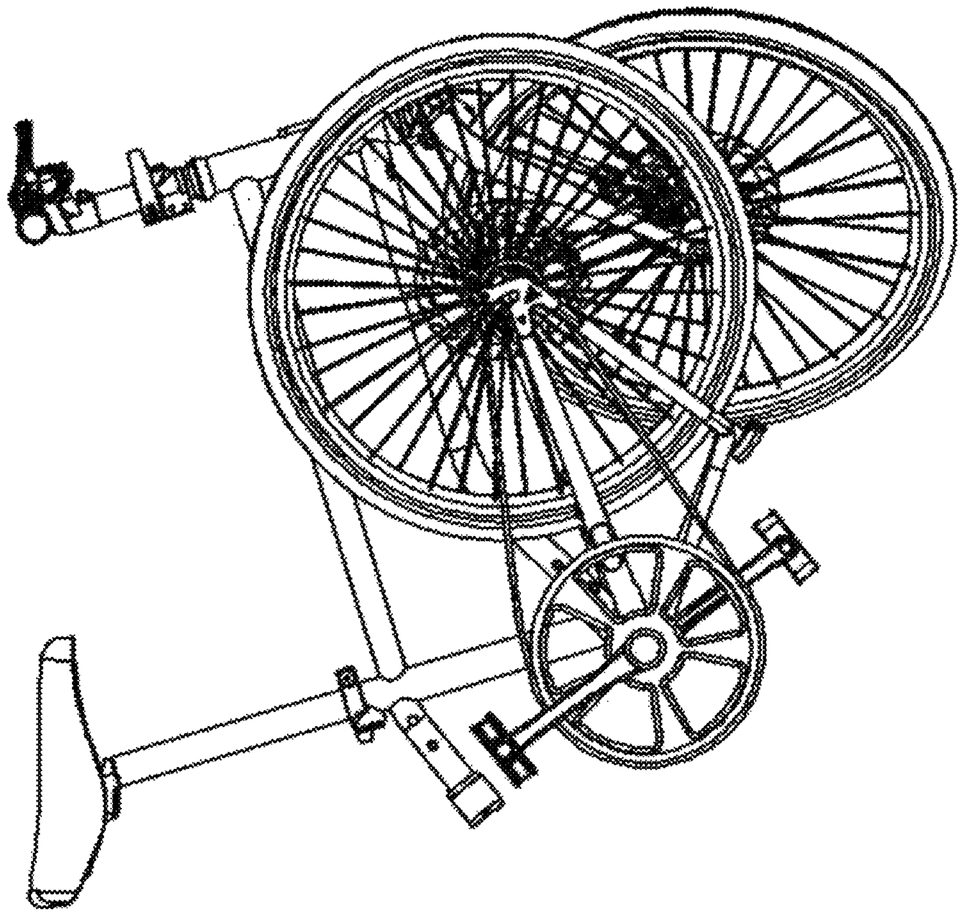
FIGS. 7-9 illustrate stages of a folding to the front wheel, which may be used in the bicycle of FIG. 1, according to some embodiments of the present invention.
Figure 8:
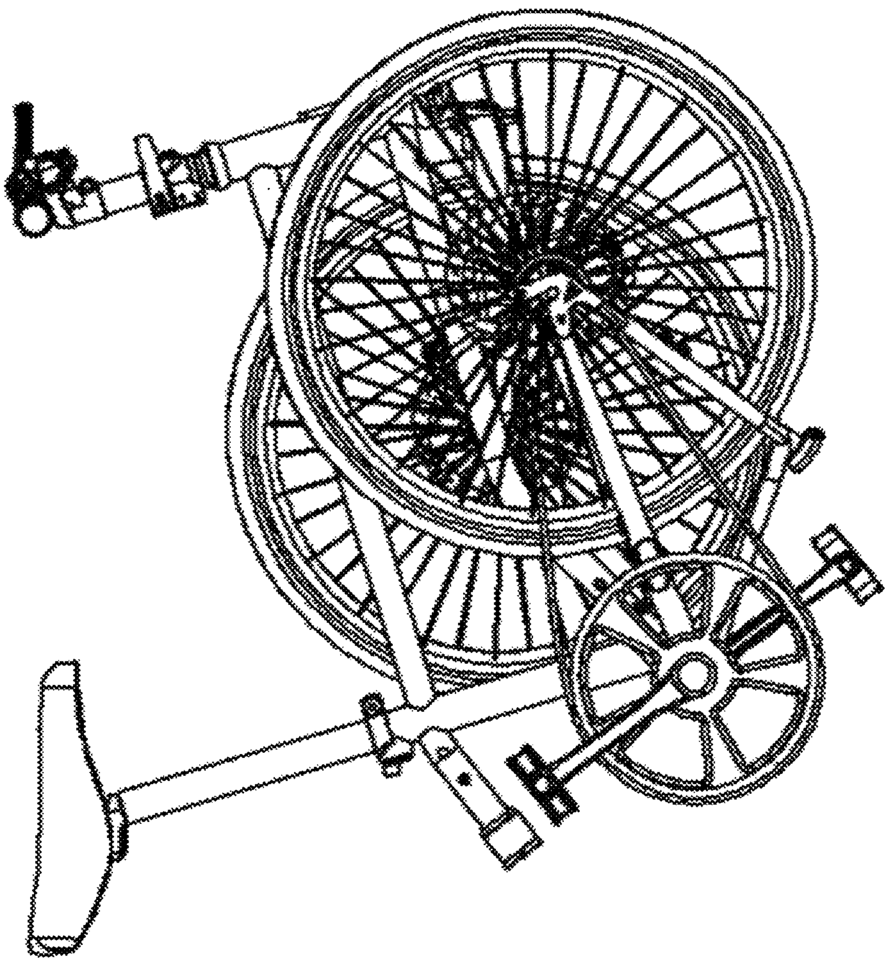
Figure 9:
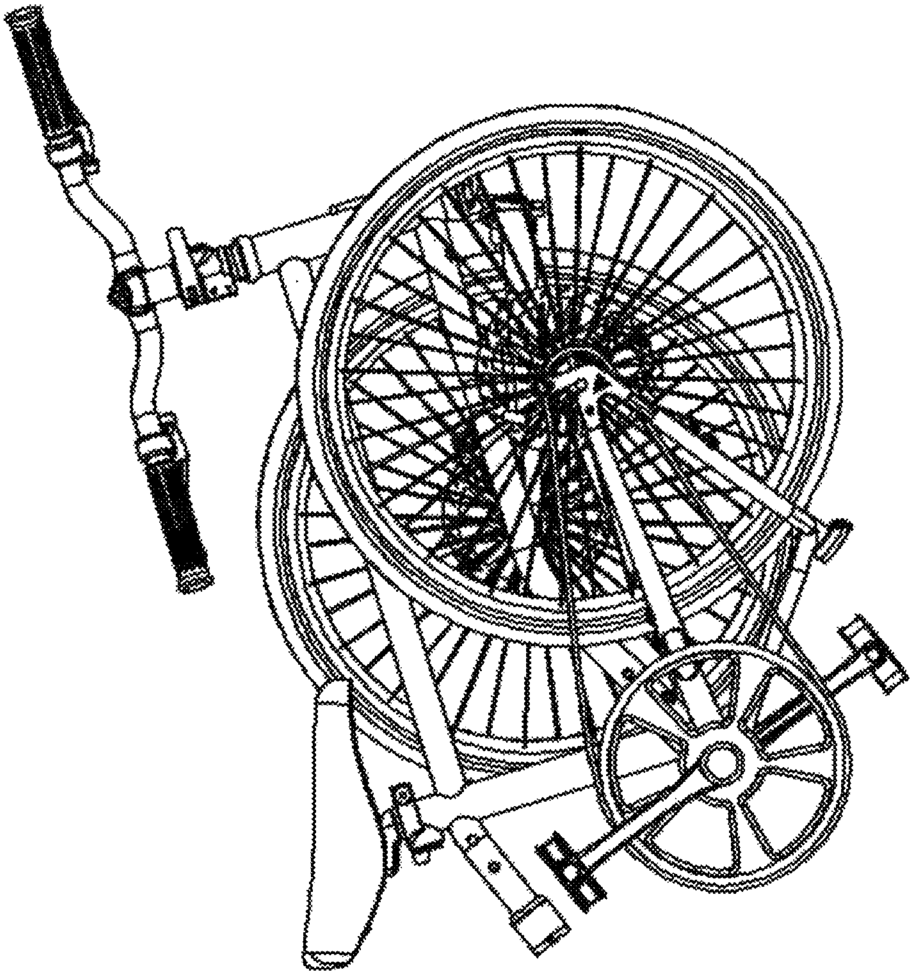

FIGS. 7-9 illustrate stages of a folding to the front wheel, which may be used in the bicycle 100 of FIGS. 1-3, according to some embodiments of the present invention.

As mentioned above, in some embodiments of the present invention, the forward wheel may also be foldable. In the example of FIGS. 7-9, the folding is effected via a foldable fork described above and described in full in U.S. Pat. No. 10,710,669, which is incorporated herein by reference.

FIG. 10 is a perspective view of a folded bicycle in which the rear wheel was folded as shown in FIGS. 4-6 and the front wheel was folded as shown in FIGS. 7-9, according to some embodiments of the present invention.

Figure 11:
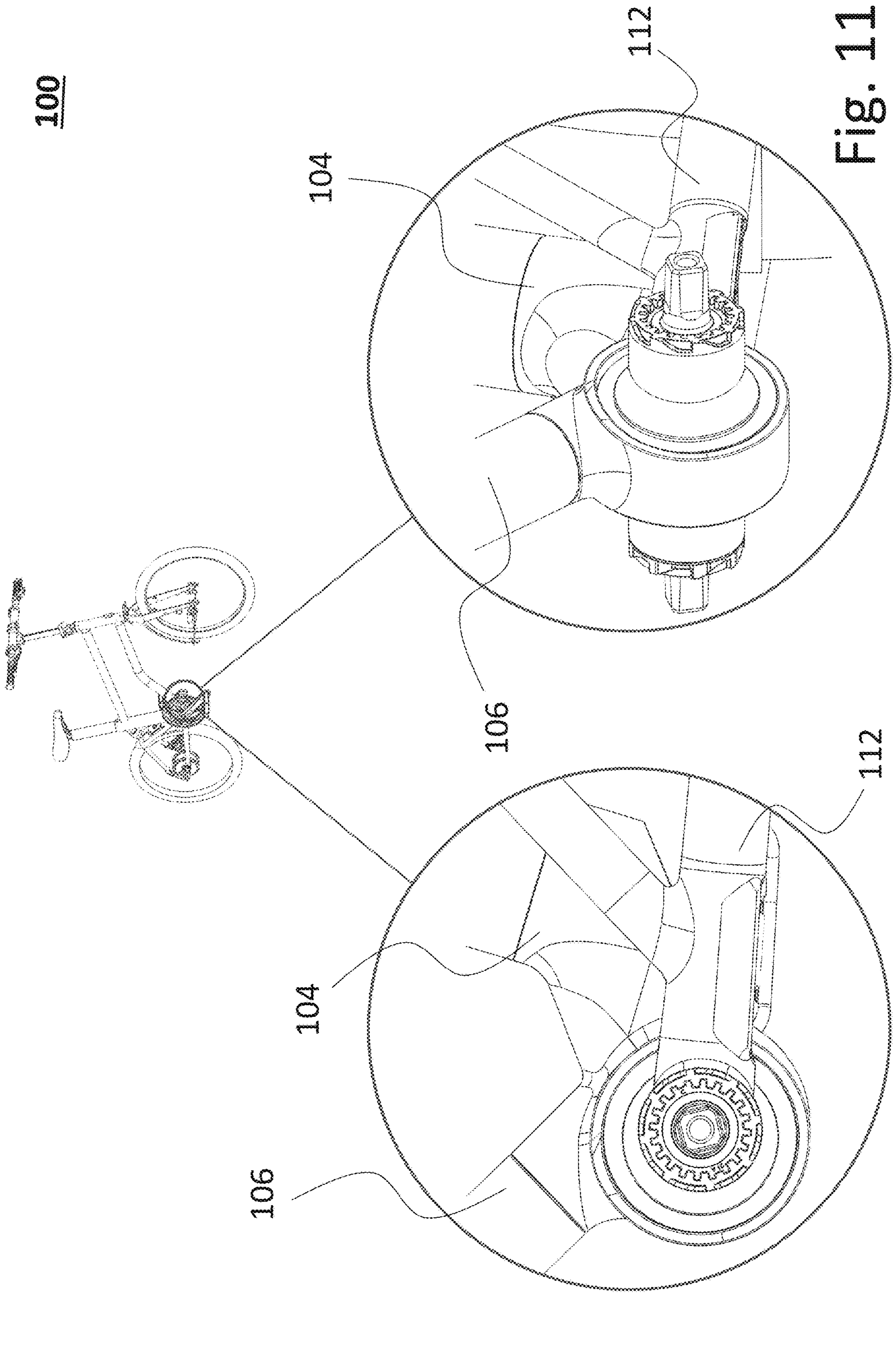
FIG. 11 is a perspective view of a foldable bicycle which includes at least one non-rotating washer disposed inside the bottom bracket tube, and at least one rotating washer disposed on an inner circumference the at least one non-rotating washer, according to some embodiments of the present invention.
Figure 12:
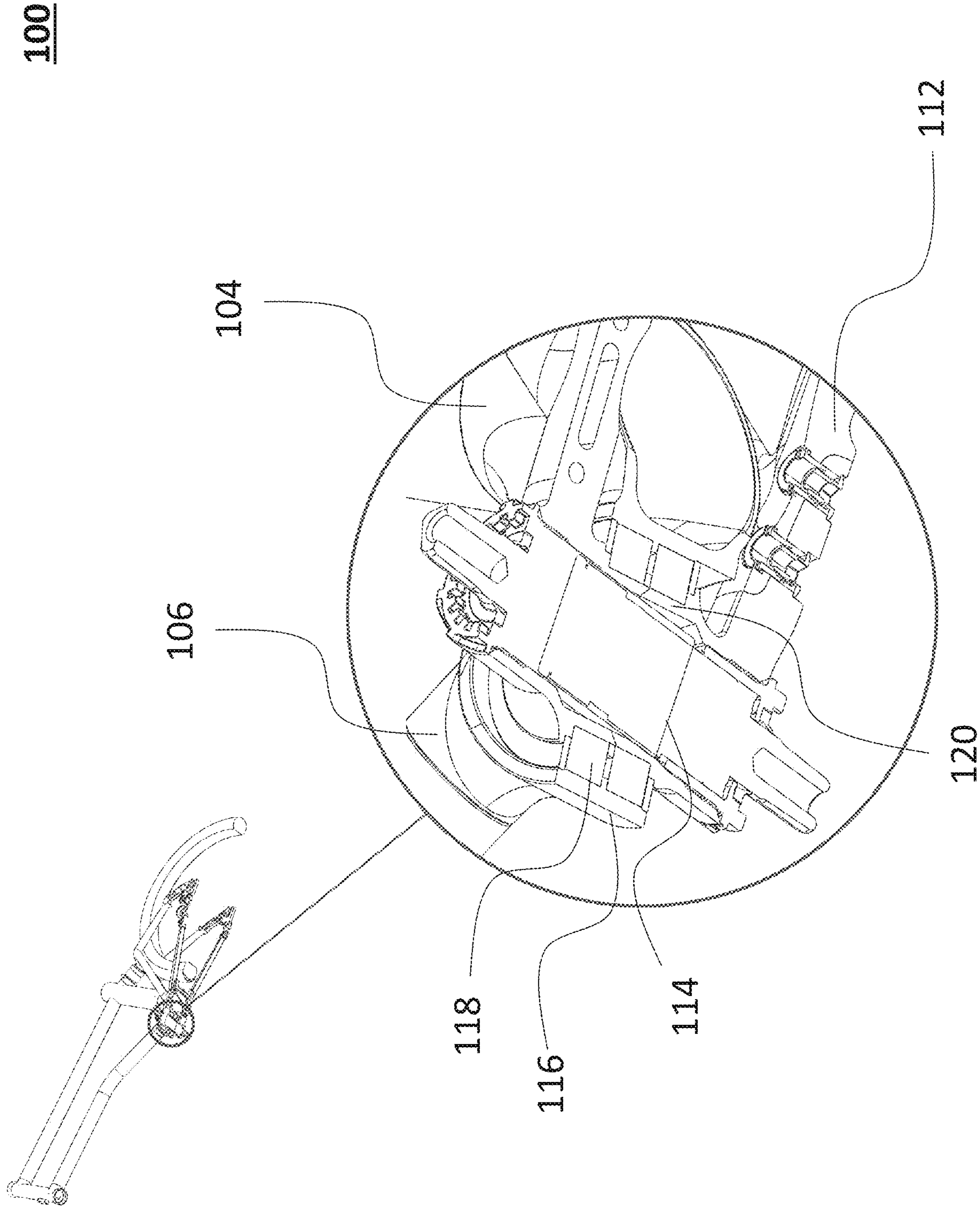
FIG. 12 is a perspective view of the internal structure of the bottom bracket tube of the foldable bicycle of FIG. 11.
Figure 13:
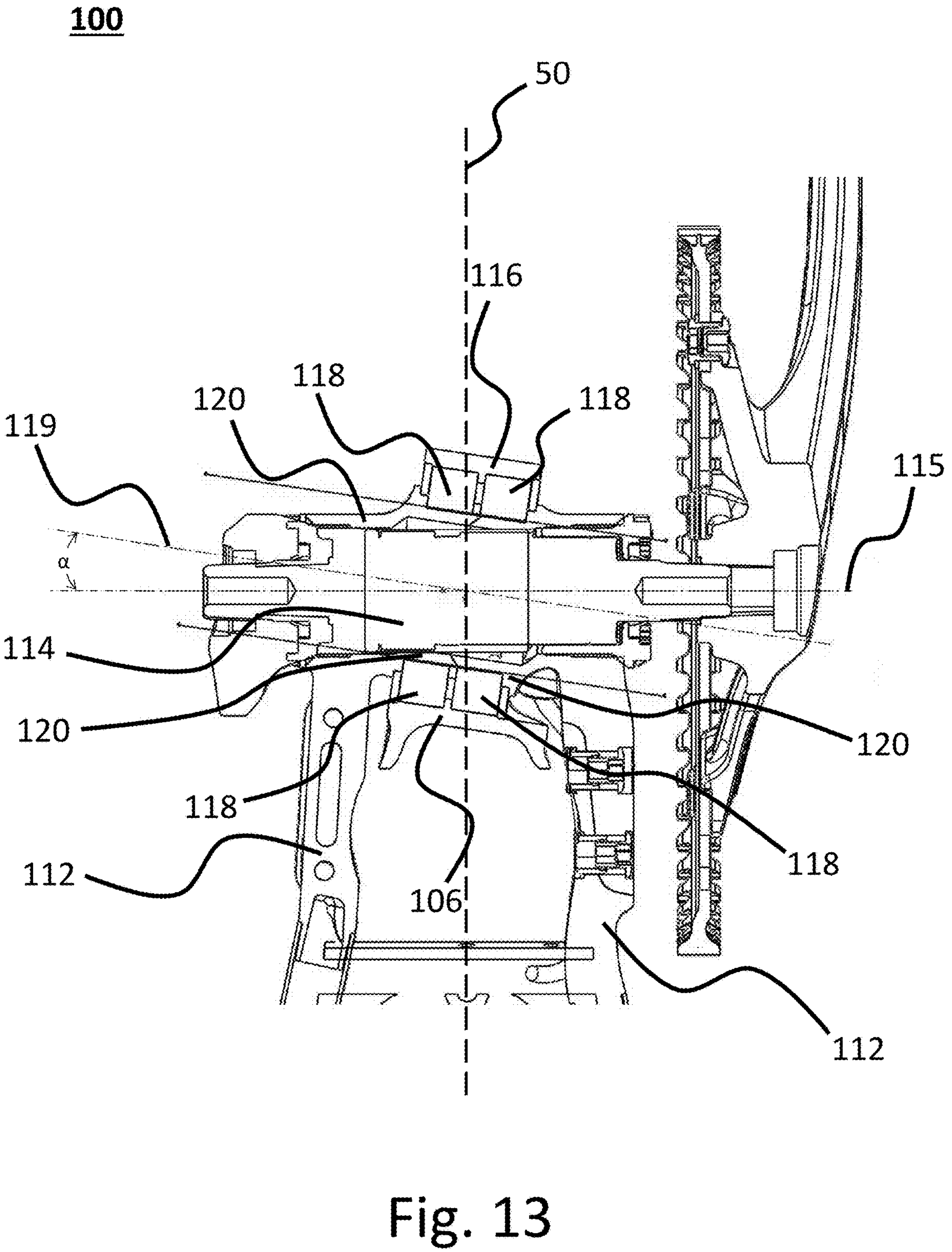
FIG. 13 is a top cross-sectional view of the portion of the bicycle of FIG. 11, which includes the bottom bracket tube, the at least one non-rotating washer, and the at least one rotating washer.
Figure 14:
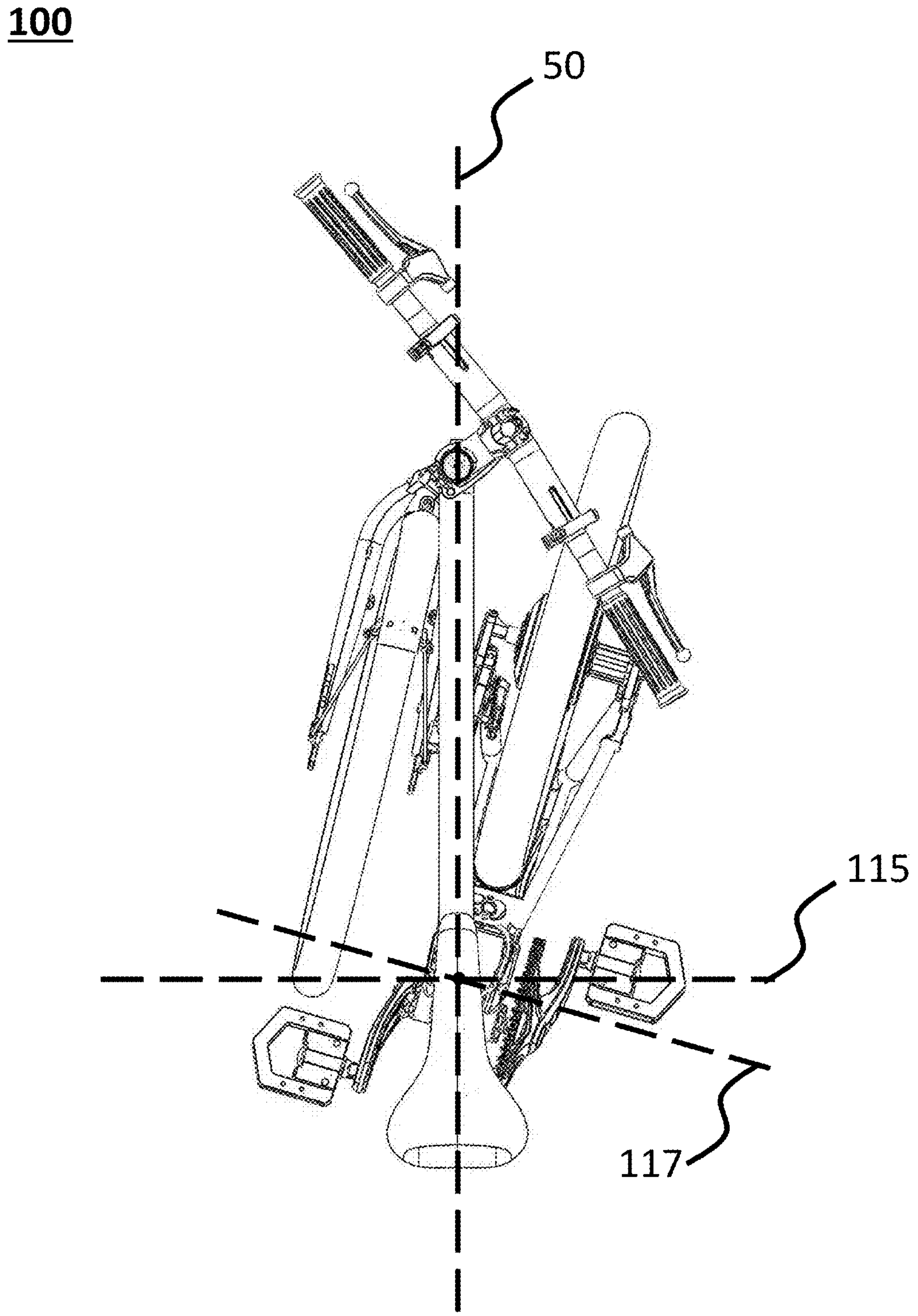
FIG. 14 is a perspective top view of the bicycle of FIG. 11 in folded configuration.

FIG. 11 is a perspective view of a foldable bicycle which includes at least one non-rotating washer disposed inside the bottom bracket tube, and at least one rotating washer disposed on an inner circumference the at least one non-rotating washer, according to some embodiments of the present invention. FIG. 12 is a perspective view of the internal structure of the bottom bracket tube of the foldable bicycle of FIG. 11. FIG. 13 is a top cross-sectional view of the portion of the bicycle of FIG. 11, which includes the bottom bracket tube, the at least one non-rotating washer, and the at least one rotating washer. FIG. 14 is a top view of the bicycle of FIG. 11 in folded configuration.

The bicycle 100 of FIGS. 11-14 is similar to the bicycle 100 of FIGS. 1-3, as described above. The difference lies in the fact that in the bicycle 100 of FIGS. 11-14, the non-rotating washer(s) 118 is (are) disposed inside the bottom bracket tube 116 and joined to the inner sueface of the bottom bracket tube 116. The rotating washer(s) 120 is (are) disposed on an inner circumference the at least one non-rotating washer 118. The pedal axle 114 traverses the at least one rotating washer 120 and is configured to rotate around the pedal axis 115, independently of the at least one rotating washer 120. The non-rotating washer(s) 118 is (are) centered about a rotation axis 119 at an angle α with respect to the pedal axis 115, as described above.

As described above, the rotating washer(s) 120 is (are) joined to the chain stays 112. Therefore, the rotating washer (s) 120 has (have) portions that extend out of the bottom bracket tube 116 on either side of the plane 50 and join to respective chain stays 112. In this manner, rotation of the rear portion of the bicycle (which includes the rear wheel 101, the chain 103, the chain stays 112, and the seat stays 108) around the rotation axis 119 is enabled, to fold the bicycle such that the rear wheel 101 is located on one side of the plane 50 in its folded position, in the same manner shown above with reference to FIGS. 4-6.

In some embodiments of the present invention, the bottom bracket tube 116 extends along the rotation axis 119. In these embodiments, as the rear portion of the bicycle (which includes the rear wheel 101, the chain 103, the chain stays 112, and the seat stays 108) rotates around the rotation axis 119, the pedal axle 114 is also rotated around the rotation axis. This can be seen in FIG. 14, where the pedal axis 117 of the folded bicycle is at an angle with the pedal axis 118 of the un-folded bicycle and with the plane 50.

What is claimed is:

1. A foldable bicycle comprising:

a head tube;

a seat tube having a top end and bottom end;

a down tube having a first front end and a first rear end, the first front end being joined to the head tube;

two seat stays, each having a respective second front end and a respective second rear end;

a forward shaft joined to both of the second front ends and being removably joinable to the seat tube, to selectively join the seat stays to and remove the seat stays from the seat tube;

two chain stays, each having a respective third front end and a respective third rear end, each of the third rear ends being joined to the second rear end of a respective one of the seat stays;

a pedal axle extending along a pedal axis;

a bottom bracket tube traversed by the pedal axle, the bottom bracket tube being joined to at least one of the first rear end of the down tube and the bottom end of the seat tube;

at least one non-rotating washer centered about a rotation axis, the at least one non-rotating washer being joined to the bottom bracket tube and disposed at an angle with the pedal axle and the pedal axis, such that the rotation axis is at a non-zero angle with respect to the pedal axis;

at least one rotating washer joined to and rotatable with respect to the at least one non-rotating washer around the rotation axis, the at least one rotating washer being joined to third front ends of the chain stays, such that chains stays are configured to be rotated about the rotation axis for folding and unfolding the bicycle.

2. The foldable bicycle of claim 1, wherein the pedal axis and the rotation axis meet on a plane that divides the bicycle into two lateral halves.

3. The foldable bicycle of claim 1, wherein the bottom bracket tube is joined to the first rear end of the down tube and to the bottom end of the seat tube.

4. The foldable bicycle of claim 1, wherein:

the bottom bracket tube is joined to the bottom end of the seat tube; and the first rear end of the down tube is joined to the seat tube.

5. The foldable bicycle of claim 1, wherein:

the bottom bracket tube is hollow;

the at least one non-rotating washer is disposed inside the bottom bracket tube;

the at least one rotating washer is disposed on an inner circumference of the at least one non-rotating washer;

the pedal axle traverses the at least one rotating washer and is configured to rotate around the pedal axis, independently of the at least one rotating washer.

6. The foldable bicycle of claim 5, wherein the bottom bracket tube is tilted with respect to the pedal axle and the pedal axis.

7. The foldable bicycle of claim 5, wherein the at least one non-rotating washer comprises at least two non-rotating washers parallel to each other, each being centered around the rotation axis.

8. The foldable bicycle of claim 5, wherein the bottom bracket tube is a hollow cylinder.

9. The foldable bicycle of claim 1, wherein:

the bottom bracket tube is hollow and is traversed by the pedal axle;

the at least one non-rotating washer comprises two non-rotating washers joined to an outer surface of the bottom bracket, one on each side of the seat tube;

the at least one rotating washer comprises two rotating washers, each rotating washer being disposed on an outer circumference of a respective one of the two non-rotating washers, such that each of the rotating washers is configured to rotate independently of the respective one of the non-rotating washers;

the third front end of each of the chain stays is joined to a respective one of the rotating washers.

10. The foldable bicycle of claim 9, wherein the bottom bracket tube is a hollow cylinder.

11. The foldable bicycle of claim 1, comprising two structural rods, each joined to a respective one of the seat stays and a respective one of the chain stays.

12. The foldable bicycle of claim 1, wherein the seat tube comprises a rear jutting, extending rearward and being configured to be selectively joined to the forward shaft.

13. The foldable bicycle of claim 1, further comprising a foldable fork, which comprises:

a stem traversing the head tube;

a pair of prongs configured to receive an axle of a front bicycle wheel;

a pivot, having an axis that is angled with respect to the axle of the bicycle wheel when the axle is connected to the prongs, the pivot connected to the stem below the head tube on a top section of the pivot and connected to the pair of prongs on a bottom section of the pivot;

wherein the top section of the pivot is configured to receive the bottom section of the pivot;

wherein the stem is configured to disengage from the pair of prongs when the bottom section of the pivot is rotated away from the top section of the pivot and wherein when connected, the bicycle wheel is disposed to a side of a connected frame of the bicycle;

wherein when the front bicycle wheel is connected, the axis of the pivot is oriented at an acute angle with respect to an axle of the connected wheel when both the axis and the axle are projected onto a plane perpendicular to a line of sight from a rear of the connected bicycle frame; and wherein the axis of the pivot is oriented at an acute angle with respect to the axle of a connected front wheel when both the axis and the axle are projected onto a plane perpendicular to a line of sight from above the foldable fork.

14. The foldable bicycle of claim 1, further comprising a top tube having a fourth front end and fourth rear end, wherein the fourth front end is joined to the head tube and the fourth rear end is joined to the seat tube.

* * * * *